(12) United States Patent
Pepper (10) Patent No.: US 7,113,707 B2
(45) Date of Patent: Sep. 26, 2006

(54) DYNAMIC OPTICAL INTERCONNECT

(75) Inventor: David M. Pepper, Malibu, CA (US)

(73) Assignee: HRL Laboratories, LLC, Malibu, CA (US)

( * ) Notice: Subject to any disclaimer, the term of this patent is extended or adjusted under 35 U.S.C. 154(b) by 868 days.

(21) Appl. No.: 09/848,563

(22) Filed: May 3, 2001

(65) Prior Publication Data

US 2002/0163697 A1 Nov. 7, 2002

(51) Int. Cl.
*H04B 10/00* (2006.01)

(52) U.S. Cl. .................. 398/129; 398/115; 398/116; 398/117; 398/118; 398/119; 398/120; 398/122; 398/123; 398/124; 398/125; 398/126; 398/128; 398/130; 398/131; 398/135; 398/136; 398/137; 398/159; 398/158; 398/169; 398/175; 398/176; 398/180; 250/201.9; 359/846; 359/849; 359/900; 356/121; 356/450; 356/491; 356/495

(58) Field of Classification Search .............. 398/180, 398/173, 135, 136, 137, 139, 156, 115, 118, 398/119, 122, 123, 126, 128, 129, 131, 116, 398/117, 120, 124, 125, 130, 158, 159, 169, 398/175, 176; 250/201.9; 359/846, 849, 359/900; 356/121, 450, 491, 495
See application file for complete search history.

(56) References Cited

U.S. PATENT DOCUMENTS

| 5,042,922 A | 8/1991 | Pepper | 359/72 |
|---|---|---|---|
| 5,046,824 A | 9/1991 | Pepper | 359/72 |
| 5,051,571 A * | 9/1991 | Brown et al. | 250/201.9 |
| 5,090,795 A | 2/1992 | O'Meara et al. | 359/240 |
| 5,684,545 A | 11/1997 | Dou et al. | 349/1 |
| 5,745,309 A * | 4/1998 | Salmon | 359/846 |
| 5,949,766 A | 9/1999 | Ibanez-Meier et al. | 370/316 |
| 6,107,617 A | 8/2000 | Love et al. | 250/201.9 |
| 6,239,888 B1 * | 5/2001 | Willebrand | 398/129 |
| 6,278,100 B1 * | 8/2001 | Friedman et al. | 250/201.9 |
| 6,577,421 B1 * | 6/2003 | Cheng et al. | 398/129 |
| 6,630,656 B1 * | 10/2003 | Wirth | 250/201.9 |
| 2002/0030824 A1 * | 3/2002 | Wirth | |

FOREIGN PATENT DOCUMENTS

WO 00/04653 A3 1/2000

* cited by examiner

*Primary Examiner*—Hanh Phan
(74) *Attorney, Agent, or Firm*—Ladas & Parry LLP (57) ABSTRACT

This invention provides a dynamic interconnection system which allows to couple a pair of optical beams carrying modulation information. In accordance with this invention, two optical beams emanate from transceivers at two different locations. Each beam may not see the other beam point of origin (non-line-of-sight link), but both beams can see a third platform that contains the system of the present invention. Each beam incident on the interconnection system is directed into the reverse direction of the other, so that each transceiver will detect the beam which emanated from the other transceiver. The system dynamically compensates for propagation distortions preferably using closed-loop optical devices, while preserving the information encoded on each beam.

67 Claims, 5 Drawing Sheets

DYNAMIC OPTICAL INTERCONNECT

TECHNICAL FIELD

The present invention relates, in general, to the field of optical telecommunications and compensated imaging. More particularly it relates to a system and method for creating an optical link between two stations, each station not necessarily being in the line of sight of the other.

BACKGROUND

The prior art includes systems for relaying optical information between two beacons. This is conventionally accomplished by first detecting and demodulating the optical information received by the first beacon from an optical source, subsequently synthesizing a optical beam by modulating another optical source with this information, and, finally, directing the new optical beam to the second beacon. This multi-element repeater system has application to well-defined relay modules, along optical fiber links for example, or for N×M interconnects for photonic networks, among others. However, in the general case, where propagation errors may be dynamic, and where the incident beams can arrive over a large field-of-view, a more robust interconnection system is required. These problems and limitations are addressed by this invention.

The prior art also includes systems comprising a set of tilt-mirror compensators which are used for correcting certain errors. Such systems can only compensate for the lowest-order errors such as tilt and astigmatism errors. Other low-order errors, such as focus, can be corrected with a variable focus element. However, these systems are unable to compensate for higher order propagation errors such as general wavefront distortions due to propagation through turbulent atmospheres, multi-mode optical fibers, etc. Thus, a system and method are needed that provide ways of compensating for these errors.

The present invention addresses the general case of phase (wavefront) errors. In this connection, the prior art includes the Double-pumped Phase Conjugate Mirror (DPCM). The DPCM does not require any servo-loop devices, since it proceeds via an all-optical nonlinear interaction. However, the DPCM requires the power carried by the incident laser beam to be above a given threshold, in order to properly function. This threshold generally ranges between a few $\mu W/cm^2$ to a few $mW/cm^2$, depending on the particular crystal used for the DPCM. Some examples of adequate crystals include $BaTiO_3$ and InP. Moreover, the response time of a DPCM depends on the intensity of the incident beams, and the intensities of the two incident beams need to have similar values for the device to function optimally (fast response time, stable operation, and suitable wavefront compensation). Finally, the DPCM is lossy and the insertion loss can be large, approaching 30% or more.

In contrast, the present device has a very low insertion loss (it only requires enough light to be sensed by the wavefront error sensor), and can function with input beams with intensities which need not to be equal (i.e., not necessarily balanced). Similar to conventional adaptive optical systems, the wavefront compensation capability will be a function of the number of equivalent pixels, or phase actuators, relative to the number of resolvable coherent phase patches which need to be phased up or corrected.

One object of the invention is to provide a system and method for relaying optical information from one transceiver to another. Specifically, this invention will direct a first optical beam emanating from a first transceiver and travelling to a second transceiver, into the reverse direction of a second optical beam emanating from the second transceiver and traveling to the first transceiver. The beams can be encoded, so that a communication link is realized with diffraction-limited capability. In its most basic form, a simple pair of tilt mirrors may be used to direct one beam into the reverse direction of the other. However, in general, the beams are not plane waves, and may have undergone time-varying (i.e., dynamically varying) propagation distortions, including atmospheric distortions, multi-mode fiber-induced distortion, etc. Therefore, an adaptive optical element is preferably used to compensate for, and to track out, these undesirable time-varying distortions, and, at the same time, provide a means for coupling the light from one direction into the other, and vice versa (without loss of the desired modulation). Since this system provides for coupling of the two optical beams, no local detector or source is required at the location of the interconnect module. Moreover, the optical beams that leave the interconnect module propagate in precisely the reverse direction of the incident beams (i.e., they are mutually phase-conjugate replicas of the incident beams). Thus, pointing and tracking is realized with this system, so that the system performance is not compromised (i.e., low insertion loss and high directivity). Finally, modulation is preserved on the various beams, so that information can be transferred from one station to another station, with diffraction-limited performance, and subject to typical adaptive optical design issues and constraints, such as diffraction, dispersion, depolarization, the compensation bandwidth, the spatial bandwidth of the system (e.g., the number of resolvable pixels for wavefront reconstruction), etc.

Applications of the present invention include optical "relay nodes" for free-space, space-based or terrestrial-based, as well as for guided-wave based (e.g., coupling of the output of a single or multi-mode fiber to another fiber or to a free-space path), optical communication and image relay links, or combinations thereof. Many applications do not afford the luxury of line-of-sight viewing between the stations at the end points of the communication link. For example, a mountain may obstruct the end points for direct viewing, or two satellites may no longer "see" each other. To overcome this problem, an intermediate "relay node" or interconnection system is required, which may be placed on a hilltop or on an intermediate satellite, such that the interconnection system is in the line of sight of both stations. It may also be necessary to optically relay (one-way or two-way) information from one subsystem (e.g., a multi-mode fiber) into another subsystem (e.g., an array of optical modulators, detectors, etc.).

Figure 1:
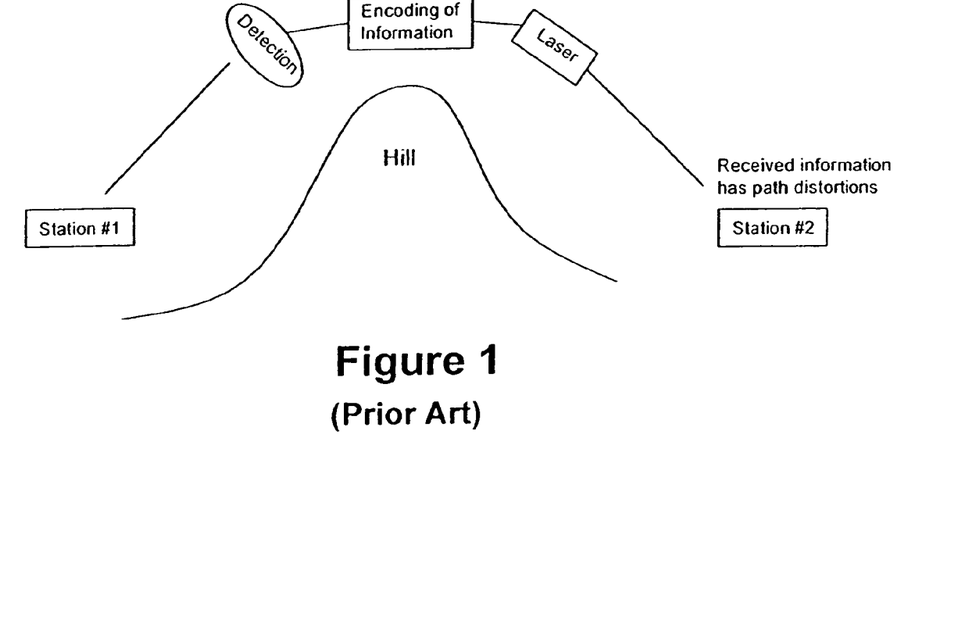
FIG. 1 illustrates a prior art system for exchanging optical information between two stations, the line of sight between the two stations being obstructed by a hill.

As shown in FIG. 1, the prior art discloses a method to first detect and demodulate the beam (originating from a first station) at the mid-point (e.g., hill-top) of the link between two stations, then to encode this information onto another laser, and finally direct the encoded data to a second station to complete the link (on the other side of the hill-top). This approach, however, does not compensate for propagation distortions.

Figure 2:
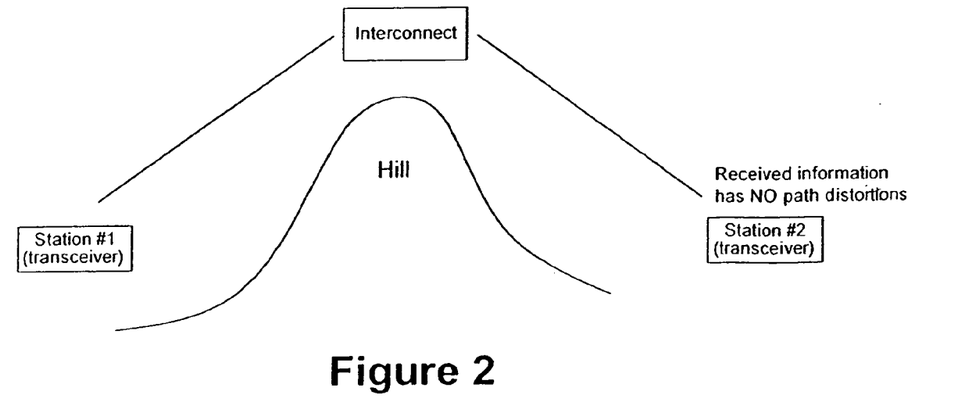
FIG. 2 shows that the interconnect of the present invention may be used for optical information exchange between two stations, even though the line of sight between the two stations is obstructed by a hill.

The present invention provides for an automatic re-directing of the beam, as it arrives at the hill-top, to the second half of the link, as shown in FIG. 2. Moreover, the invention compensates for propagation distortions, so that the beam will arrive at the other end of the link without distortion. This invention enables such an intermediate node to be realized, without the usual photonic repeater requirements of high-bandwidth photo-detection, modulation and retransmission of the data. In this invention, the temporal modulation format imposed onto the beam from its initial point of origin is preserved. As it goes through the interconnection system only its wavefronts are modified, while its temporal encoding is maintained. Further, the system can function using mutually incoherent sources (e.g., free-running lasers at each end point of the link). When both of these lasers impinge onto the system, the beam from one of the end-points will be directed into the wavefront-reversed direction of the path that the second beam took, thereby "finding" and arriving to the other end of the link distortion-free (assuming usual time scale of beam formation by the system, range, atmosphere distortion time scale, and motion of the source locations during the optical transit time).

Additionally, the system of the present invention provides for "auto-tracking". Indeed, if the end-point stations are moving, the interconnect can track or follow the moving stations. This assumes that the stations move slowly with respect to the reconfiguration time of the interconnect and the time/spacial scale of the dynamic distortions. The system provides for propagation-distortion compensation as well.

A related application is in the area of space-based low-cost relay mirrors. A pair of large-area telescopes are used to collect a weak signal, and then relay the beam to another location. These lightweight mirrors, which may be made of thin membranes (mylar, etc.), often possess optical distortions because the lightweight material they are made of can easily deform. The system performance is thereby degraded. By placing the proposed invention between the pair of large-area relay mirrors, the local mirror aberrations, as well as path distortions experienced by the two incident beams, can be corrected in real-time. Other potential areas of application include stratospheric relay platforms, such as LEO and MEO satellites and other airborne systems, with application to backbone feeder lines, as well as dynamic links for optical fibers, laser sources and beam combining systems. In the latter case, a given incident probe beam can be used as a local reference beam, which can, as a result of the interconnection system, phase up a collection of single-frequency, but randomly phased oscillators, including optical fiber amplifiers and oscillators.

SUMMARY

This invention provides a novel system that can adaptively interconnect two incoherent optical beams thereby creating an optical link between two stations. This invention also provides a method of optically interconnecting two stations from which two optical beams emanate, the two optical beams being directed from the two stations to a common location such as a hilltop.

The overall scope of this invention is to provide a dynamic interconnect capability to couple a pair of spectrally narrowband or broadband optical beams, which may carry modulation information. By way of an example, let us suppose that two optical beams emanate from transceivers at two different locations, and are both incident upon the optical interconnection system of the present invention. The system will direct each beam into the reverse (i.e., phase conjugate) direction of the other, so that each transceiver will detect the beam that emanated from the other station.

In general, the incident beams propagate along different paths, and, thus, may experience different propagation distortions, beam wander, etc. This invention provides an interconnection system for optical beams which may have experienced different Doppler shifts, possess different wavefront distortions, speckle, as well as depolarization (the latter two cases would involve the use of additional SLMs (Spatial Light Modulators).

The system architecture comprises a pair of closed-loop Adaptive Optical (AO) modules (or, two regions on a common-focus correction module, the latter for bore-sighting the two beams and adaptive optical element), in conjunction with an optional tilt-focus compensator for low-order aberration errors, if necessary. Also comprised in the system are a number of reflectors and beam splitters. Each AO module is controlled by a given input beam.

The system of this invention is not a conventional repeater device. That is, it does not merely detect and demodulate the beam, and then encode the information onto another optical source (e.g., a relay station). Instead, it re-directs one optical beam into the reverse direction of another by modifying its wavefronts. In this manner, the system compensates for wavefront errors along the paths of the two incident beams, resulting in a well-defined output beam, with near-diffraction-limited performance. Moreover, any global modulation information is preserved on each incident beam, which is redirected into the reverse path of the other beam. Therefore, no demodulation and subsequent repeater-based modulator elements are required, thereby greatly simplifying the basic system architecture. If necessary, however, optical amplifiers can be placed at any point along the system (including at the interconnect module). The interconnect module will provide compensation for optical distortions in the amplifiers as well.

DETAILED DESCRIPTION

An embodiment of this invention is illustrated with reference to FIG. 3A, another embodiment is illustrated with reference to FIG. 3B, and yet another embodiment is shown with reference to FIG. 4. The systems of FIGS. 3A and 3B relate to an optical interconnect functioning in reflection mode, whereas the system of FIG. 4 relates to an optical interconnect functioning in transmission mode. The following description applies equally to both the reflection-mode systems of FIGS. 3A and 3B and the transmission-mode system of FIG. 4. When appropriate the distinctions between these two systems are made clear.

For the purpose of illustration, beam 9 originating from station A, and beam 10 originating from station B, are shown displaced relative to one another. In actuality, the two beams travel on top of one another, in opposite directions.

The system allows two stations, A and B, to exchange information via an optical link created between them using an interconnect. The interconnect preferably comprises a pair of Adaptive Optical (AO) modules 3 and 4, each of which comprising a pair of AO wavefront correctors 3a and 4a, and a pair of Wavefront Error Sensors 3b and 4b to drive AO wavefront correctors 3a and 4a respectively. The interconnect further comprises a pair of optical tilt-focus error compensators 7 and 8, placed upstream and downstream of the AO modules, respectively, and a pair of beam splitters 17 and 18 placed between the AO modules. Tilt-focus error compensator 7 is positioned between station A and AO module 3 such that tilt-focus error compensator 7 is in the light path between station A and AO module 3. Similarly, tilt-focus error compensator 8 is positioned between station B and AO module 4 such that tilt-focus error compensator 8 is in the light path between station B and AO module 4. Alternatively, the configuration shown in FIG. 3B may be used wherein a single optical tilt-focus error compensator 78 is used instead of two. In this case, the optical tilt-focus error compensator 78 is placed near the midpoint of the overall system, in the light path between AO module 3 and AO module 4, approximately midway between the two modules. Beam 15, resulting from the reflection of beam 9 by AO wavefront corrector 3a, is split by beam splitter 17 into a first part which is directed to AO module 4, and a second part which is directed to WES 3b. WES 3b senses the distortions (e.g., its wavefront errors) of the beam, computes the required correction and addresses the AO wavefront corrector 3a to drive the input distortions to zero or nearly zero, depending on the servo-loop gain of the system. Similarly, beam 16, resulting from the reflection of beam 10 by AO wavefront corrector 4a, is split by beam splitter 18 into a first part which is directed to AO module 3, and a second part which is directed to WES 4b. WES 4b senses the distortions of the beam, computes the required correction and addresses the AO wavefront corrector 4a to drive these input distortions to zero or near zero. This is an example of a servo-loop or closed-loop system.

Each AO module is driven or controlled (i.e., configured, in terms of its pixelated phase map) by the respective incident optical beam. AO module 3 is controlled by optical beam 9 originating from station A, while AO module 4 is controlled by optical beam 10 originating from station B.

In order to optimize the efficiency of the system, beam splitters 17 and 18 are preferably designed to transmit most of the incident light (typically in the range of 90% of the incident light, depending on the signal-to-noise ratio (SNR) achieved) to AO module 4 and AO module 3, respectively, while reflecting just enough light to WES 3b and WES 4b, respectively, so that the WESs can function with adequate SNR (i.e., SNR>1, preferably in the range of 10 to 100 or more).

Figure 3A:
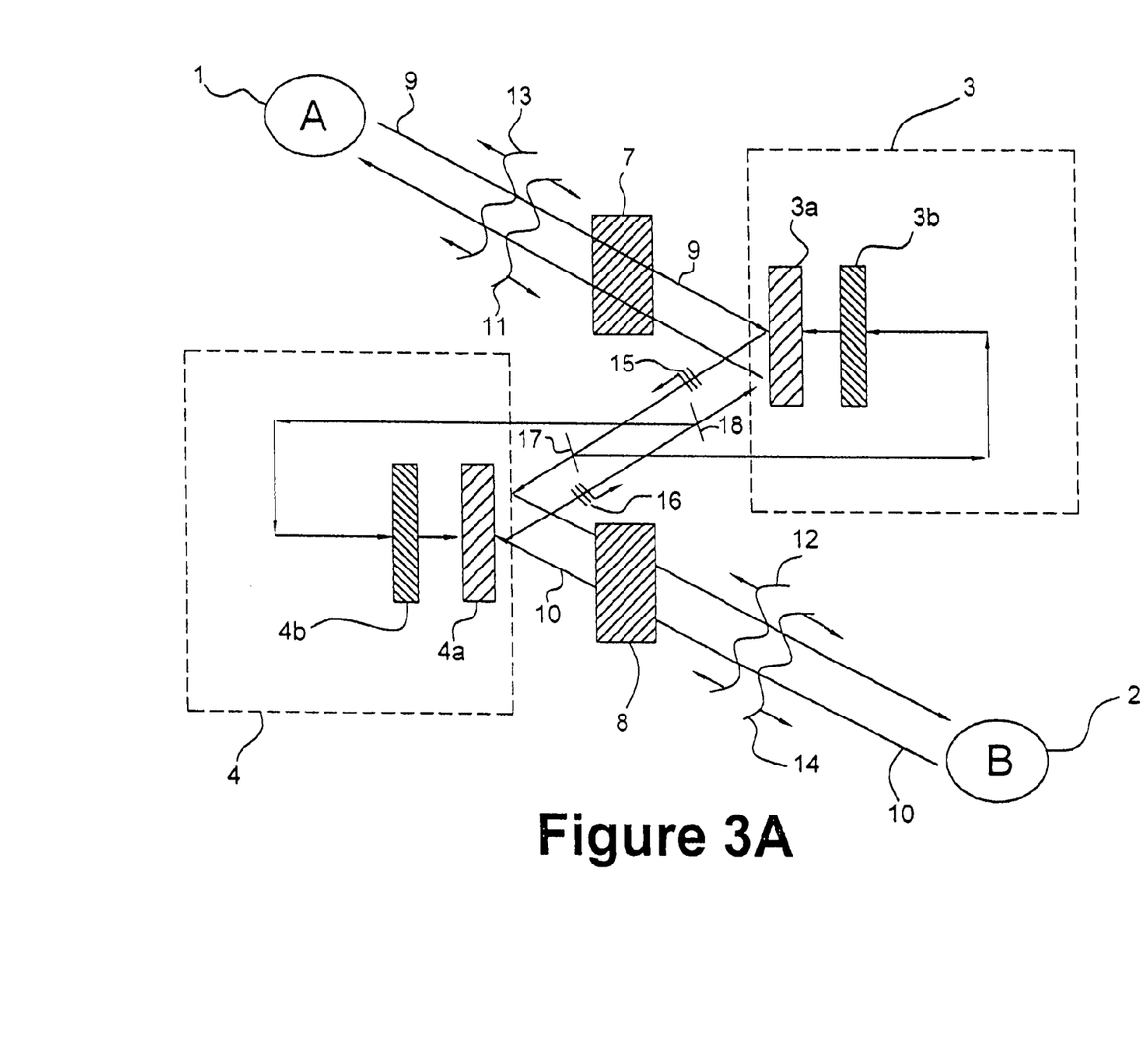
FIG. 3A depicts an embodiment of this invention wherein the AO modules function in reflection mode, and wherein a pair of optical tilt-focus error compensators is used.

The purpose of the optical tilt-focus error compensators 7 and 8, as shown in FIG. 3A, is to remove overall tilt and/or focus errors between the pair of beams, so that they propagate in exact opposition to each other within the system (i.e., they counter-propagate). These compensators 7 and 8 may be omitted if the field-of-view and the dynamic range of the AO modules 3 and 4 provide sufficient correction for lower-order errors (tilt and focus) without compromising the ability to compensate for higher-order wavefront errors on the respective input beams. This assumes that the AO modules have sufficient dynamic range (i.e, greater than a wave, preferably greater than several waves).

For the purpose of illustration, let us suppose that incident beams 9 and 10, each possesses an arbitrary wavefront error upon incidence onto the respective AO modules 3 and 4. Moreover, let us assume that each beam is encoded with information, in the form of either amplitude or phase modulation. Assume further that the encoded modulation bandwidth exceeds the adaptive optical closed-loop compensation bandwidth, so that the desired modulation is preserved, after beam error compensation. The compensation bandwidth must equal or exceed the distortion effective bandwidth for the system to function. As an example, atmospheric distortions have a time scale on the order of a millisecond, so the AO compensation bandwidth must be greater than 1 KHz. On the other hand, the desired communication bandwidth (or link data rate) can be very large (1 to 100 GHz, for example).

The role of the AO module 3 is to minimize, upon reflection/transmission by/through AO module 3, the wavefront errors carried by the input beam 9. For example, AO module 3 will drive the spatial phase error $\phi_{res}$ of incident beam 9 to a small residual value dictated by the closed-loop servo gain G ($\phi_{res} \cong \phi_{in}/(1+G)$, where $\phi_{in}$ is the input phase error). The gain G usually ranges from about 2 to about 100, with higher values of G giving better system performance. The result of this operation is that a highly aberrated input beam 9, will, after reflection by/transmission through AO module 3, emerge as a near-plane wave 15. Note that any global phase or intensity modulation will remain on the planarized (i.e., the scrubbed) beam 15. The planarized beam 15 maintains the globally encoded modulation information. This modulated plane wave 15 will then be reflected/transmitted by/through the other AO module, namely AO module 4. Note that the cleaned-up beam 15 does not affect the spatial phase of AO module 4 since this module is controlled by incident beam 10 originating from station B.

By reciprocity, the plane wave 15 will, upon reflection off/transmission through AO module 4, emerge with the same wavefront as beam 10 had before it reflected off/transmitted through AO 4 The encoded beam 9 will thus propagate into the precise reverse direction of beam 10 and arrive at station B as a diffraction-limited beam. Diffraction-limited characterizes a beam with highest focusing ability, and is determined by the ratio, $\lambda/D$, where $\lambda$ is the wavelength and D the aperture. Optical distortions increase this ratio by one to several orders of magnitude ($\times 10$ to $\times 1000$, or more) which in turn degrades performance.

The foregoing discussion is also applicable to AO module 4, input beam 10, planarized beam 16 and station A.

Figure 3B:
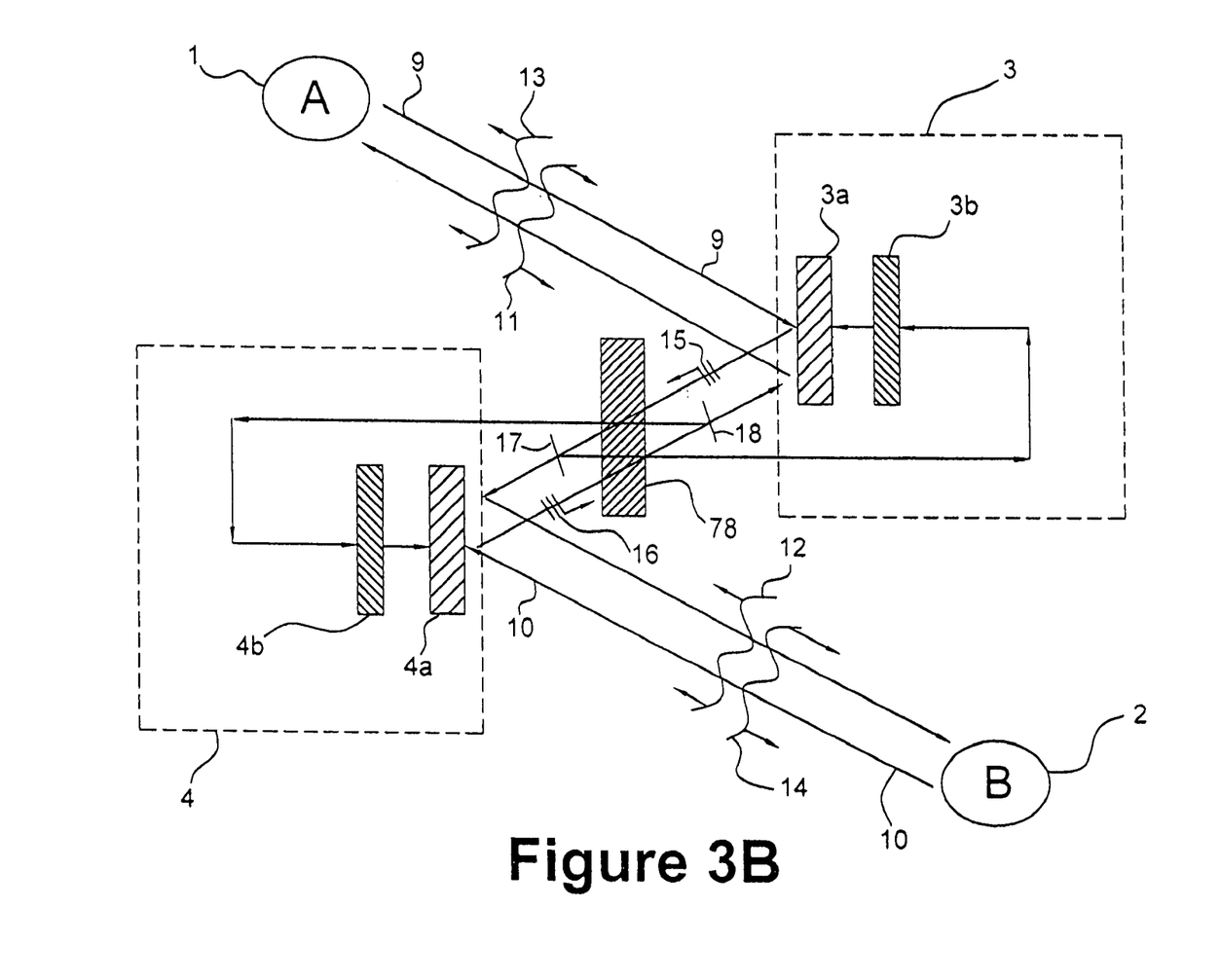
FIGS. 3B depicts an embodiment of this invention wherein the AO modules function in reflection mode, and wherein a single optical tilt-focus error compensator is used.
Figure 4:
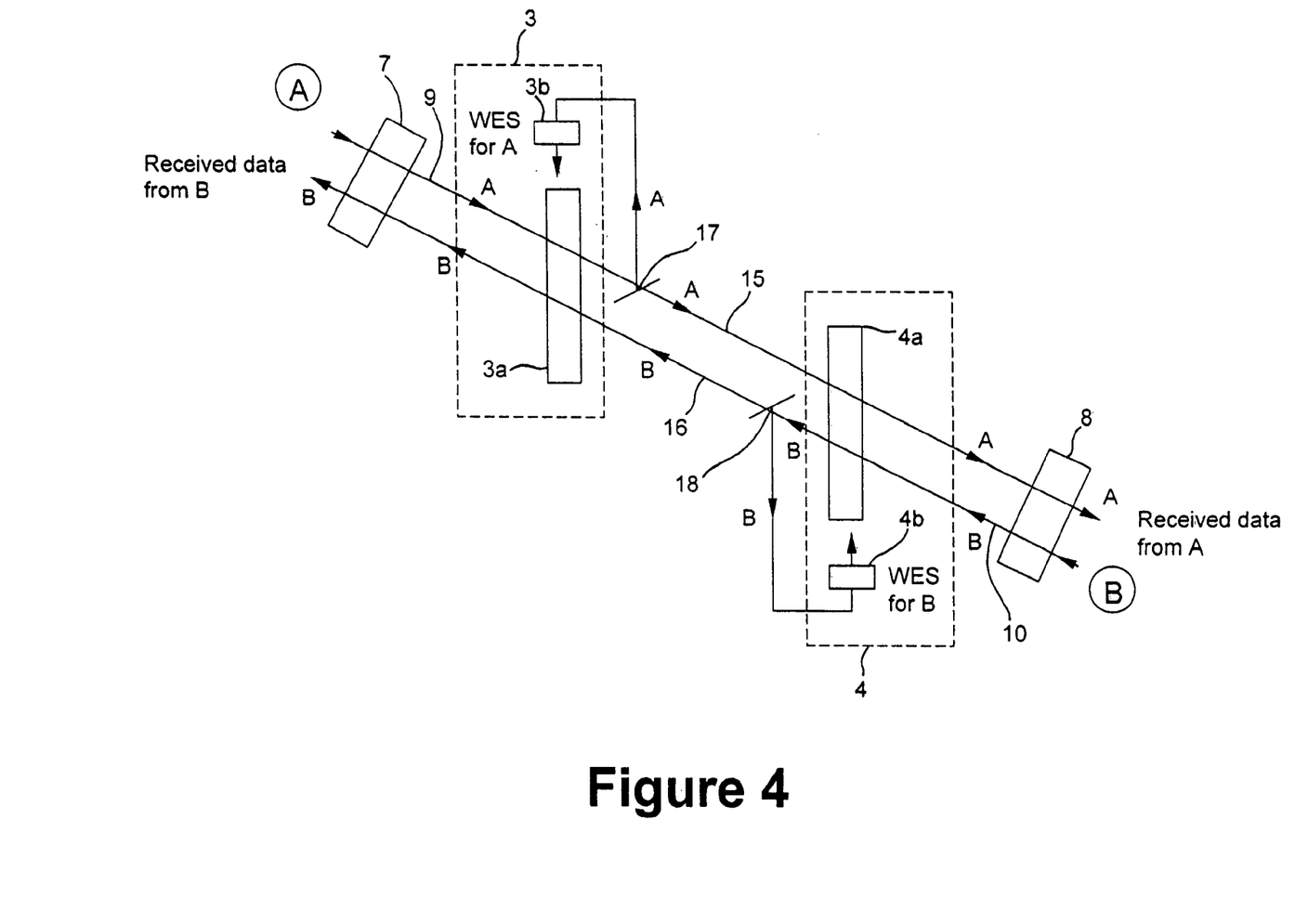
FIG. 4 depicts an embodiment of this invention wherein the AO modules function in transmission mode.
Figure 5:
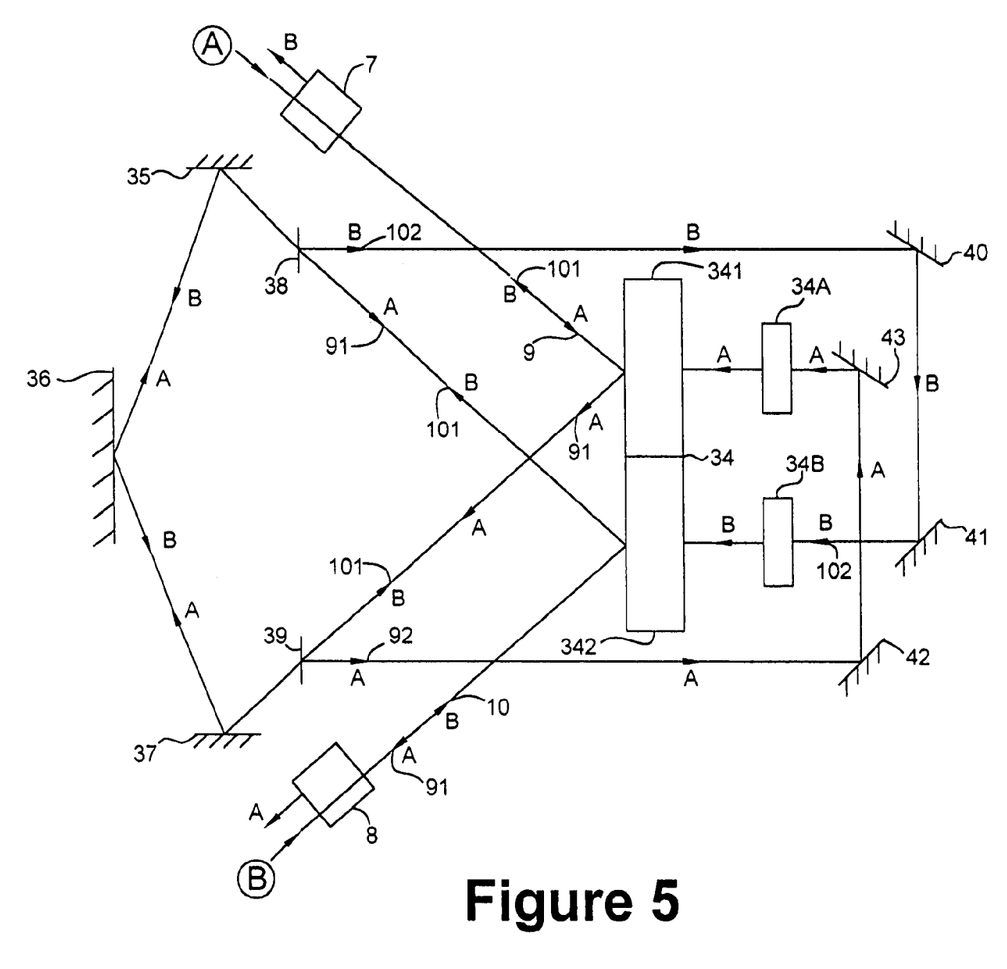
FIG. 5 depicts an embodiment of this invention wherein a single AO module is used, the AO module comprising a single AO wavefront corrector having two regions, and a pair of Wavefront error sensors.

In yet another embodiment of the present invention, the two AO wavefront correctors 3a and 4a of FIGS. 3A, 3B and 4, are replaced with two regions on a common-focus correction module, as illustrated in FIG. 5. In accordance with this embodiment, the interconnect comprises a common-focus correction module or AO wavefront corrector 34 having a first region 341 and a second region 342, each region forming a separate AO wavefront corrector. The interconnect further comprises a pair of WESs 34A and 34B, to drive AO wavefront corrector regions 341 and 342 respectively, a pair of optical tilt-focus error compensators 7 and 8, placed upstream of the AO wavefront corrector 34, a pair of beam splitters 38 and 39, and seven reflectors 35, 36, 37, 40, 41, 42 and 43. Tilt-focus error compensator 7 is positioned between station A and AO wavefront corrector 34 such that station A, tilt-focus error compensator 7, and region 341 of the AO Wavefront corrector 34, are substantially aligned. Similarly, tilt-focus error compensator 8 is positioned between station B and AO wavefront corrector 34 such that station B, tilt-focus error compensator 8, and region 342 of the AO Wavefront corrector 34, are substantially aligned. Beam 91, resulting from the reflection of beam 9 by AO wavefront corrector region 341, is split, by beam splitter 39, into a first part which is directed to AO wavefront corrector region 342 after successive reflection by reflectors 37, 36 and 35, and a second part (beam 92) which is directed to WES 34A after successive reflection by reflectors 42 and 43. WES 34A senses the distortion of the beam, computes the required correction and addresses AO wavefront Corrector region 341 to drive input distortion to zero or near zero. Corrected beam 91 emerges from AO wavefront corrector region 341, substantially distortion free or at least with reduced distortions. Part of beam 91, i.e beam 92, is redirected to WES 34A for further corrections and so on. This illustrates the functioning of a servo-loop or closed-loop system. Similarly, beam 101, resulting from the reflection of beam 10 by AO wavefront corrector region 342, is split, by beam splitter 38, into a first part which is directed to AO wavefront corrector region 341 after successive reflection by reflectors 35, 36 and 37, and a second part (beam 102) which is directed to WES 34B after successive reflection by reflectors 40 and 41. WES 34B senses the distortion of the beam, computes the required correction and addresses AO wavefront corrector region 342 to drive input distortion to zero or near zero. Corrected beam 101 emerges from AO wavefront Corrector region 342, substantially distortion free or at least with reduced distortion. Part of corrected beam 101, i.e., beam 102 is redirected to WES 34B for further corrections and so on.

Each of AO wavefront corrector regions 341 and 342, is driven or controlled (i.e., configured, in terms of its pixelated phase map) by the respective incident optical beam. AO wavefront corrector region 341 is controlled by optical beam 9 originating from station A, while AO wavefront corrector region 342 is controlled by optical beam 10 originating from station B.

In order to optimize the efficiency of the system, beam splitters 38 and 39 are preferably designed to transmit most of the incident light, while reflecting just enough light then sensed by WES 34B and WES 34A, respectively, so that the WESs can function with a adequate signal-to-noise ratio.

The purpose of the optical tilt-focus error compensators 7 and 8, is to remove overall tilt and/or focus errors between the pair of compensated beams, so that they propagate in exact opposition to each other within the system (i.e., they counter-propagate). These compensators 7 and 8 may be omitted if the field-of-view and the dynamic range of the AO wavefront corrector 34 provides sufficient correction for these lower-order errors (tilt and focus) without compromising the ability to compensate for the higher-order wavefront errors on the respective input beams. This assumes that the AO wavefront corrector 34 has sufficient dynamic range.

For the purpose of illustration, let us suppose that incident beams 9 and 10, each possesses an arbitrary wavefront error upon incidence onto the respective AO wavefront corrector regions 341 and 342. Moreover, let us assume that each beam is encoded with useful global information, in the form of either amplitude or phase modulation. We further assume that the encoded modulation bandwidth exceeds the adaptive optical closed-loop compensation bandwidth, so that the desired modulation is preserved, after beam clean-up. The compensation bandwidth must equal or exceed the distortion effective bandwidth for the system to function. As an example, atmospheric distortions have a time scale on the order of a millisecond, so the AO compensation bandwidth must be greater than 1 KHz. On the other hand, the desired communication bandwidth (or link data rate) can be very large (1 to 100 GHz, for example).

The role of the AO wavefront corrector region 341 (342, respectively) and WES 34A (34B, respectively) is to minimize, upon reflection by AO wavefront corrector region 341 (342, respectively), the wavefront errors carried by the input beam 9 (10, respectively). That is, AO wavefront corrector region 341 (342, respectively) will drive the spatial phase error $\phi_{res}$ of incident beam 9 (10, respectively) to a small residual value dictated by the closed-loop servo gain G ($\phi_{res} \cong \phi_{in}/(1+G)$, where $\phi_{in}$ is the input phase error). The gain G usually ranges from about 2 to about 100, higher values giving better system performance. The result of this operation is that a highly aberrated input beam 9 (10, respectively), will, after reflection by AO wavefront corrector region 341 (342, respectively), emerge as a near-plane wave 91 (101, respectively). Note that any global phase or intensity modulation will remain on the planarized (i.e., the scrubbed) beam 91 (101, respectively). The planarized beam 91 (101, respectively) maintains the globally encoded modulation information. This modulated plane wave 91 (101, respectively) will then be reflected by reflectors 37, 36, and 35 (35, 36, and 37, respectively) and finally by the other AO wavefront corrector region, namely AO wavefront corrector region 342 (341, respectively) which directs corrected modulated plane wave 91 (101, respectively) to its final destination, i.e., station B (station A, respectively). Note that the cleaned-up beam 91 (101, respectively) does not affect the spatial phase of AO wavefront corrector region 342 (341, respectively) since this region is controlled by incident beam 10 (9, respectively) originating from station B (A, respectively).

By reciprocity, plane wave 91 (101, respectively) will, upon reflection by AO wavefront corrector region 342 (341, respectively), emerge with the same wavefront as beam 10 (9, respectively) had before it reflected off AO wavefront corrector region 342 (341, respectively). The encoded beam 9 (10, respectively) will thus propagate into the precise reverse direction of beam 10 (9, respectively) and arrive at station B (A, respectively) as a diffraction-limited beam. Diffraction-limited characterizes a beam with highest focusing ability, and is determined by the ratio, $\lambda/D$, where $\lambda$ is the wavelength and D the aperture. Optical distortions increase this ratio by one to several orders of magnitude ($\times 10$ to $\times 1000$, or more) which in turn degrades performance.

The different types of AO modules suitable for the embodiments previously described, include reflective devices such as Liquid Crystal Light Valves (LCLVs) or LC pixelated phase shifters, which can be optically or electrically driven on a pixel-by-pixel basis, liquid crystal Spatial Light Modulators (SLMs), deformable MEMS devices, or optical MEMS-based SLMs. Suitable AO modules may also include transmission devices such as liquid crystal cells with transparent electrodes or any combination of the these devices. Conventional wavefront error sensors may also be used which drive deformable mirrors (e.g., PZT-activated, etc.). Regardless of which devices are used, an incident beam will emerge from each AO module with its wavefronts planarized.

Possible wavefront error sensors include conventional shearing interferometric sensor, a Shack-Hartmann (local tilt) sensor, or a holographic intensity-to-phase sensor.

Possible global tilt-focus error compensator (used for bore-sighting) include a pair of tilt mirrors (conventional, optical MEMS, etc.), a pair of real-time liquid crystal gratings, etc., which are driven by a standard closed-loop quad detector-based servo loop.

The various elements comprised in the interconnection system are preferably packaged in a compact structure. The distances between the two stations and the interconnection system may be large, however.

The system of the present invention acts as an optical interconnect, essentially coupling the two beams that emanate from their respective transceivers (stations), while maintaining their encoded information. Each beam leaves the interconnection system in the form of a phase-conjugate replica of the other beam; yet, the temporal encoding on each beam is preserved. Since the pair of AO modules 3 and 4, or regions 341 and 342, are locally controlled by input beams 9 and 10 respectively, the two beams do not need to be coherent or even have the same nominal wavelength (the allowed wavelength difference is governed by the dispersion and diffraction of the system, and the propagation path characteristics for a given range). Thus, the system can function in the presence of differential Doppler shifted beams, emanating from platforms moving at different speeds, as well as with general beam wander and propagation errors.

The system can also function in guided-wave architectures, providing dynamic coupling of information from one fiber (or waveguide) channel to another, or to a plurality of channels. All that is required is that a given channel provide a reference or beacon beam so that the AO module can planarize the beam and, at the same time, provide for a phase-conjugate return of the temporally encoded beam back to the reference beam point of origin.

Having described the invention in connection with certain embodiments thereof, modifications will certainly suggest themselves to those skilled in the art. As such, the invention is not to be limited to the disclosed embodiments except as required by the appended claims.

The invention claimed is:

1. A method of optically interconnecting a first station to a second station by coupling a first optical beam and a second optical beam, the first optical beam originating from the first station and being directed to the second station, the second optical beam originating from the second station and being directed to the first station, the method comprising:
   (a) providing a first adaptive optical module and a second adaptive optical module, the first adaptive optical module comprising a first adaptive optical wavefront corrector and a first wavefront error sensor, the second adaptive optical module comprising a second adaptive optical wavefront corrector and a second wavefront error sensor;
   (b) disposing the first adaptive optical module in a path of the first beam for
      (i) reflecting and directing the first beam from the first adaptive optical wavefront corrector to the second adaptive optical module;
      (ii) after reflecting of a corrected first beam by the first adaptive optical wavefront corrector, a first part of the corrected first beam is directed to the first wavefront error sensor;
      (iii) the first wavefront error sensor sensing a distortion of the first beam, computing a correction, and addressing the first adaptive optical wavefront corrector to reduce the distortion of the first beam by producing the corrected first beam after reflection of the first beam by the first adaptive optical wavefront corrector; and
      (iv) reflecting the second beam received from the second adaptive optical module, and directing the second beam to the first station; and
   (c) disposing the second adaptive optical module in a path of the second beam for
      (i) reflecting and directing the second beam from the second adaptive optical wavefront corrector to the first adaptive optical module;
      (ii) after reflecting of a corrected second beam by the second adaptive optical wavefront corrector, a first part of the corrected second beam is directed to the second wavefront error sensor;
      (iii) the second wavefront error sensor sensing a distortion of the second beam, computing a correction, and addressing the second adaptive optical wavefront corrector to reduce the distortion of the second beam by producing the corrected second beam after reflection of the second beam by the second adaptive optical wavefront corrector; and
      (iv) reflecting the first beam received from the first adaptive optical module, and directing the first beam to the second station.

2. The method of claim 1 further comprising the step of compensating for propagation errors and wherein the first and second optical modules function in a closed-loop fashion.

3. The method of claim 2, further including the steps of:
   (a) providing at least one optical tilt-focus error compensator for removing tilt and/or focus errors between the first and second beams so that the beams counter-propagate; and
   (b) disposing the at least one optical tilt-focus error compensator between the first adaptive optical module and the second adaptive optical module, such that the at least one optical tilt-focus error compensator is in a light path between the first adaptive optical module and the second adaptive optical module.

4. The method of claim 3, wherein the at least one optical tilt-focus error compensator comprises a first optical tilt-focus error compensator and a second optical tilt-focus error compensator, the method further including the steps of:
   (a) disposing the first optical tilt-focus error compensator between the first station and the first adaptive optical module such that the first beam passes through the first optical tilt-focus error compensator before it reaches the first adaptive optical module; and
   (b) disposing the second optical tilt-focus error compensator between the second station and the second adaptive optical module such that the second beam passes through the second optical tilt-focus error compensator before it reaches the second adaptive optical module.

5. The method of claim 4 wherein at least one of the first and second adaptive optical modules comprises an adaptive optical wavefront corrector and a wavefront error sensor.

6. The method of claim 4, wherein at least one of the first and second optical tilt-focus error compensators comprises a pair of tilt mirrors or a pair of real-time crystal gratings.

7. The method of claim 5, wherein the wavefront error sensor comprises conventional shearing interferometric sensors, Shack-Hartmann (local tilt) sensors, or holographic intensity-to-phase sensors.

8. The method of claim 1 wherein:
   after correction of the first beam, and reflection and directing of the corrected first beam by the first adaptive optical wavefront corrector, a second part of the corrected first beam is directed to the second adaptive optical wavefront corrector;

the second adaptive optical wavefront corrector reflects and directs the corrected first beam to the second station;

after correction of the second beam, and reflection and directing of the corrected second beam by the second adaptive optical wavefront corrector, a second part of the corrected second beam is directed to the first adaptive optical wavefront corrector; and the first adaptive optical wavefront corrector reflects and directs the corrected second beam to the first station.

9. The method of claim 1, wherein the adaptive optical modules comprise LCLVs, liquid crystal SLMs, deformable MEMS devices, optical MEMS-based SLMs, or liquid crystal cell with transparent electrodes, or any combination thereof.

10. A method of creating an optical link between a first and a second station for the purpose of exchanging information between the two stations, the method comprising the steps of:
(a) providing a first optical beam emanating from the first station, and a second optical beam emanating from the second station;
(b) pointing the first optical beam and the second optical beam to a common location;
(c) directing each beam into a reverse direction of the other so that each station receives the beam which emanated from the other station; and
(d) correcting propagation distortions of the first and second optical beams.

11. The method of claim 10 wherein the step of correcting propagation distortions of the first and second optical beams includes a step of planarizing the wavefronts of the first and second optical beams, the step of planarizing the first and second optical beams being carried out by at least one adaptive optical module, the at least one adaptive optical module functioning in a closed-loop fashion.

12. The method of claim 11 further including the step of compensating for tilt and focus errors of the first and second optical beams, the step of compensating for tilt and focus errors being executed by at least one optical tilt-focus error compensator.

13. The method of claim 12, wherein information is encoded onto the first optical beam at the first station, information is encoded onto the second optical beam at the second station, and wherein the first optical beam arrives at the second station as a diffraction-limited beam and delivers to the second station the information encoded onto the first optical beam at the first station, and the second optical beam arrives at the first station as a diffraction-limited beam and delivers to the first station the information encoded onto the second optical beam at the second station.

14. The method of claim 13, wherein the first and second stations comprise at least one transceiver.

15. An interconnect for optically interconnecting a first station and a second station, the interconnect comprising:
a first adaptive optical module positioned in the line of sight of the first station for correcting for propagation distortion occurring between the first station and the interconnect;
a second adaptive optical module positioned in the line of sight of the second station and in the line of sight of the first adaptive optical module for correcting for propagation distortion occurring between the second station and the interconnect.

16. The interconnect of claim 15, wherein the first and second adaptive optical modules function in a closed-loop fashion.

17. The interconnect of claim 16, wherein:
the first adaptive optical module (i) directs to the second adaptive optical module, a first optical beam received from the first station, and (ii) directs to the first station, a second optical beam received from the second adaptive optical module and originating from the second station; and
the second adaptive optical module (i) directs to the first adaptive optical module, the second optical beam received from the second station, and (ii) directs to the second station, the first optical beam received from the first adaptive optical module and originating from the first station.

18. The interconnect of claim 17 further comprising at least one optical tilt-focus error compensator for removing tilt and focus errors from at least one of the first and second optical beams.

19. The interconnect of claim 18 wherein the at least one optical tilt-focus error compensator comprises a first optical tilt-focus error compensator and a second optical tilt-focus error compensator, the first optical tilt-focus error compensator being disposed between the first station and the first adaptive optical module such that the first beam passes through the first optical tilt-focus error compensator before reaching the first adaptive optical module; and the second optical tilt-focus error compensator being disposed between the second station and the second adaptive optical module such that the second beam passes through the second optical tilt-focus error compensator before reaching the second adaptive optical module.

20. The interconnect of claim 19 wherein at least one of the first and second adaptive optical modules comprises an adaptive optical wavefront corrector and a wavefront error sensor.

21. The interconnect of claim 20 wherein:
the first adaptive optical module comprises:
a first adaptive optical wavefront corrector; and
a first wavefront error sensor disposed adjacent the first adaptive optical wavefront corrector; and
the second adaptive optical module comprises:
a second adaptive optical wavefront corrector; and
a second wavefront error sensor disposed adjacent the second adaptive optical wavefront corrector.

22. The interconnect of claim 21 further comprising:
a first beam splitter for splitting the first beam, the first beam splitter being disposed in a light path between the first and second adaptive optical modules; and
a second beam splitter for splitting the second beam, the second beam splitter being disposed in a light path between the first and second adaptive optical modules.

23. The interconnect of claim 22 wherein the first and second adaptive optical modules function in reflection mode.

24. The interconnect of claim 23 wherein:
the first adaptive optical wavefront corrector directs the first beam to the second adaptive optical module by reflecting a corrected first beam;
after reflecting of the corrected first beam by the first adaptive optical wavefront corrector, a first part of the corrected first beam is redirected by the first beam splitter to the first wavefront error sensor;
the first wavefront error sensor senses distortion of the first beam, computes a correction, and addresses the first adaptive optical wavefront corrector to reduce the distortion of the first beam by producing the corrected first beam after reflection of the first beam by the first adaptive optical wavefront corrector;

after correction of the first beam, and reflection and directing of the corrected first beam by the first adaptive optical wavefront corrector, a second part of the corrected first beam is transmitted by the first beam splitter to the second adaptive optical wavefront corrector;

the second adaptive optical wavefront corrector reflects and directs the corrected first beam to the second station;

the second adaptive optical wavefront corrector directs the second beam to the first adaptive optical module by reflecting a corrected second beam;

after reflecting of a corrected second beam by the second adaptive optical wavefront corrector, a first part of the corrected second beam is redirected by the second beam splitter to the second wavefront error sensor;

the second wavefront error sensor senses distortion of the second beam, computes a correction, and addresses the second adaptive optical wavefront corrector to reduce the distortion of the second beam by producing a corrected second beam after reflection of the second beam by the second adaptive optical wavefront corrector;

after correction of the second beam, and reflection and directing of the corrected second beam by the second adaptive optical wavefront corrector, a second part of the corrected second beam is transmitted by the second beam splitter to the first adaptive optical wavefront corrector; and the first adaptive optical wavefront corrector reflects and directs the corrected second beam to the first station.

25. The interconnect of claim 23, wherein propagation error correction includes planarizing at least one of the first and second optical beams.

26. The interconnect of claim 25, wherein information is encoded onto the first optical beam at the first station, information is encoded onto the second optical beam at the second station, and wherein the first optical beam arrives at the second station as a diffraction-limited beam and delivers to the second station the information encoded onto the first optical beam at the first station, and the second optical beam arrives at the first station as a diffraction-limited beam and delivers to the first station the information encoded onto the second optical beam at the second station.

27. The interconnect of claim 22 wherein the first and second adaptive optical modules function in transmission mode.

28. The interconnect of claim 27 wherein:

the first adaptive optical wavefront corrector directs the first beam to the second adaptive optical module by transmitting a corrected first beam;

after transmission of the corrected first beam by the first adaptive optical wavefront corrector, a first part of the corrected first beam is redirected by the first beam splitter to the first wavefront error sensor;

the first wavefront error sensor senses distortion of the first beam, computes a correction, and addresses the first adaptive optical wavefront corrector to reduce the distortion of the first beam by producing the corrected first beam after transmission of the first beam by the first adaptive optical wavefront corrector;

after correction of the first beam, and transmission of the corrected first beam by the first adaptive optical wavefront corrector, a second part of the corrected first beam is transmitted by the first beam splitter to the second adaptive optical wavefront corrector;

the second adaptive optical wavefront corrector transmits the corrected first beam to the second station;

the second adaptive optical wavefront corrector directs the second beam to the first adaptive optical module by transmitting a corrected second beam;

after transmitting of a corrected second beam by the second adaptive optical wave front corrector, a first part of the corrected second beam is redirected by the second beam splitter to the second wavefront error sensor;

the second wavefront error sensor senses distortion of the second beam, computes a correction, and addresses the second adaptive optical wavefront corrector to reduce the distortion of the second beam by producing a corrected second beam after transmission of the second beam by the second adaptive optical wavefront corrector;

after correction of the second beam, and transmission and directing of the corrected second beam by the second adaptive optical wavefront corrector, a second part of the corrected second beam is transmitted by the second beam splitter to the first adaptive optical wavefront corrector; and the first adaptive optical wavefront corrector transmits the corrected second beam to the first station.

29. The interconnect of claim 27, wherein propagation error correction includes planarizing at least one of the first and second optical beams.

30. The interconnect of claim 21, wherein the first and second stations comprise at least one transceiver.

31. The interconnect of claim 20, wherein the wavefront error sensor comprises conventional shearing interferometric sensors, Shack-Hartmann (local tilt) sensors, or holographic intensity-to-phase sensors.

32. The interconnect of claim 18 wherein the at least one optical tilt-focus error compensator is disposed between the first adaptive optical module and the second adaptive optical module, such that the at least one optical tilt-focus error compensator is in a light path between the first and second adaptive optical modules.

33. The interconnect of claim 18, wherein the at least one optical tilt-focus error compensator comprises a pair of tilt mirrors or a pair of real-time crystal gratings.

34. The interconnect of claim 17, wherein at least one of the first and second stations is a moving station, and wherein the interconnect provides for auto-tracking of the at least one moving station.

35. The interconnect of claim 16, wherein the first and second adaptive optical modules comprise LCLVs, liquid crystal SLMs, deformable MEMS devices, optical MEMS-based SLMs, or liquid crystal cells with transparent electrodes, or any combination thereof.

36. In an optical system, a method of compensating for propagation errors in at least two counter-propagating optical beams, the method comprising the steps of:

(a) providing at least one adaptive optical module;
(b) receiving the at least two counter-propagating optical beams by the at least one adaptive optical module;
(c) detecting the propagation errors by the at least one adaptive optical module in each of the at least two counter-propagating optical beams;
(d) computing corrections to compensate for the propagation errors in each of the at least two counter-propagating optical beams;
(e) applying the corrections to the received counter-propagating optical beams and (f) sending corrected optical beams by the at least one adaptive optical module.

37. The method of claim 36, wherein steps (b), (c), (d), (e), and (f) represent the steps of a closed-loop method.

38. The method of claim 37, wherein the at least one adaptive optical module comprises at least one adaptive optical wavefront corrector, at least one wavefront error sensor, and at least one beam splitter.

39. The method of claim 38, further including the step of addressing the at least one adaptive optical wavefront corrector by the at least one wavefront error sensor, after the step of computing corrections to compensate for the propagation errors and before the step of applying the corrections to the received counter-propagating optical beams wherein:
the step of receiving the at least two counter-propagating optical beams is carried out by the at least one adaptive optical wavefront corrector;
the step of detecting the propagation errors is carried out by the at least one wavefront error sensor after a part of the optical beam is directed to the at least one wavefront error sensor by the at least one beam splitter;
the step of computing corrections is carried out by the at least one wavefront error sensor;
the step of applying the corrections to the received counter-propagating optical beams is carried out by the at least one adaptive optical wavefront corrector; and
the step of sending corrected optical beams is carried out by the at least one adaptive optical wavefront corrector.

40. The method of claim 39, further comprising the step of compensating for tilt-focus errors with at least one tilt-focus error compensator.

41. The method of claim 40 wherein the propagation errors comprise wavefront distortions.

42. The method of claim 41 wherein compensating for propagation errors includes planarizing the optical beams.

43. The method of claim 40 wherein information modulated on the optical beams is preserved throughout steps (a), (b), (c), (d), (e), and (f), and wherein the corrected optical beam is a diffraction limited beam.

44. A method of optically interconnecting a first station to a second station by coupling a first optical beam and a second optical beam, the first optical beam originating from the first station and being directed to the second station, the second optical beam originating from the second station and being directed to the first station, the method comprising:
(a) providing an adaptive optical module;
(b) disposing the adaptive optical module in the propagation path of the first beam and in the propagation path of the second beam;
(c) reflecting and directing the first beam to the second station;
(d) reflecting and directing the second beam to the first station; and
(e) correcting propagation errors in the first and second optical beams.

45. The method of claim 44 wherein the adaptive optical module functions in a closed-loop fashion.

46. The method of claim 45, further including:
(e) providing a first optical tilt-focus error compensator and a second optical tilt-focus error compensator for removing tilt and/or focus errors between the first and second beams so that the beams counter-propagate;
(f) disposing the first optical tilt-focus error compensator between the first station and the adaptive optical module such that the first beam passes through the first optical tilt-focus error compensator before reaching the adaptive optical module; and (g) disposing the second optical tilt-focus error compensator between the second station and the adaptive optical module such that the second beam passes through the second optical tilt-focus error compensator before reaching the adaptive optical module.

47. The method of claim 46 wherein the adaptive optical module comprises:
an adaptive optical wavefront corrector having a first region and a second region;
a first wavefront error sensor disposed adjacent the first region;
a second wavefront error sensor disposed adjacent the second region;
a first beam splitter disposed in a path light of the first beam; and
a second beam splitter disposed in a path light of the second beam; wherein,
the first wavefront error sensor senses the propagation errors of the first beam, computes a correction, and addresses the first region of the adaptive optical wavefront corrector to correct propagation errors of the first beam as the first beam is reflected by the first region of the adaptive optical wavefront corrector; and
the second wave front error sensor senses propagation errors of the second beam, computes a correction, and addresses the second region of the adaptive optical wavefront to correct propagation errors of the second beam as the second beam is reflected by the second region of the adaptive optical wavefront corrector.

48. The method of claim 47 wherein,
after reflecting of a corrected first beam by the first region of the adaptive optical wavefront corrector, a first part the corrected first beam is directed by the first beam splitter to the first wavefront error sensor;
after correction of the first beam, and reflection and directing of the corrected first beam by the first region of the adaptive optical wavefront corrector, a second part of the corrected first beam is directed by the first beam splitter to the second region of the adaptive optical wavefront corrector;
the second region of the adaptive optical wavefront corrector then reflects and directs the corrected first beam to the second station;
after reflecting of a corrected second beam by the second region of the adaptive optical wavefront corrector, a first part the corrected second beam is directed by the second beam splitter to the second wavefront error sensor;
after correction of the second beam, and reflection and directing of the corrected second beam by the second region of the adaptive optical wavefront corrector, a second part of the corrected second beam is directed by the second beam splitter to the first region of the adaptive optical wavefront corrector; and
the first region of the adaptive optical wavefront corrector then reflects and directs the corrected second beam to the first station.

49. The method of claim 48, further comprising providing a plurality of reflectors, wherein the reflectors are used in (i) directing the first optical beam to the second station and the second optical beam to the first station, and (ii) directing the first part of the first beam to the first wave front error sensor and directing the first part of the second beam to the second wavefront error sensor.

50. The method of claim 47, wherein the wavefront error sensor comprises conventional shearing interferometric sensors, Shack-Hartmann (local tilt) sensors, or holographic intensity-to-phase sensors.

51. The method of claim 46, wherein at least one of the first and second optical tilt-focus error compensators comprises a pair of tilt mirrors or a pair of real-time crystal gratings.

52. The method of claim 44, wherein the adaptive optical module comprise LCLVs, liquid crystal SLMs, deformable MEMS devices, optical MEMS-based SLMs, or liquid crystal cells with transparent electrodes, or any combination thereof.

53. An interconnect for optically interconnecting a first station and a second station, the interconnect coupling a first optical beam and a second optical beam, the first optical beam originating from the first station and being directed to the second station, the second optical beam originating from the second station and being directed to the first station, the interconnect comprising:
   an adaptive optical wavefront corrector positioned in the line of sight of the first station and in the line of sight of the second station, the adaptive optical wavefront corrector having a first region and a second region;
   a first wavefront error sensor disposed adjacent the first region; and
   a second wavefront error sensor disposed adjacent the second region.

54. The interconnect of claim 53, wherein propagation errors are corrected by the adaptive optical wavefront corrector and the first and second error sensors, the adaptive optical wavefront corrector and the first and second error sensors forming a closed-loop optical device.

55. The interconnect of claim 54 further comprising at least one optical tilt-focus error compensator for removing tilt and focus errors from at least one of the first and second optical beams.

56. The interconnect of claim 55 wherein the at least one optical tilt-focus error compensator comprises a first optical tilt-focus error compensator and a second optical tilt-focus error compensator, the first optical tilt-focus error compensator being disposed between the first station and the adaptive optical wavefront corrector such that the first beam passes through the first optical tilt-focus error compensator before reaching the first region of the adaptive optical wavefront corrector, and the second optical tilt-focus error compensator being disposed between the second station and the adaptive optical wavefront corrector such that the second beam passes through the second optical tilt-focus error compensator before reaching the second region of the adaptive optical wavefront corrector.

57. The interconnect of claim 54, wherein
   the first wavefront error sensor senses the propagation errors of the first beam, computes a correction, and addresses the first region of the adaptive optical wavefront corrector to correct propagation errors of the first beam as the first beam is reflected by the first region of the adaptive optical wavefront corrector; and
   the second wavefront error sensor senses propagation errors of the second beam, computes a correction, and addresses the second region of the adaptive optical wavefront to correct propagation errors of the second beam as the second beam is reflected by the second region of the adaptive optical wavefront corrector.

58. The interconnect of claim 57 further comprising a first beam splitter and a second beam splitter, wherein,
   after reflecting of a corrected first beam by the first region of the adaptive optical wavefront corrector, a first part the corrected first beam is directed by the first beam splitter to the first wavefront error sensor;
   after correction of the first beam, and reflection and directing of the corrected first beam by the first region of the adaptive optical wavefront corrector, a second part of the corrected first beam is directed by the first beam splitter to the second region of the adaptive optical wavefront corrector;
   the second region of the adaptive optical wavefront corrector then reflects and directs the corrected first beam to the second station;
   after reflecting of a corrected second beam by the second region of the adaptive optical wavefront corrector, a first part of the corrected second beam is directed by the second beam splitter to the second wavefront error sensor;
   after correction of the second beam, and reflection and directing of the corrected second beam by the second region of the adaptive optical wavefront corrector, a second part of the corrected second beam is directed by the second beam splitter to the first region of the adaptive optical wavefront corrector; and
   the first region of the adaptive optical wavefront corrector then reflects and directs the corrected second beam to the first station.

59. The interconnect of claim 58 further comprising a plurality of reflectors, wherein the reflectors are used in (a) directing the first optical beam to the second station and the second optical beam to the first station, and (b) directing the first part of the first beam to the first wavefront error sensor and directing the first part of the second beam to the second wavefront error sensor.

60. The interconnect of claim 59, wherein propagation error correction includes planarizing at least one of the first and second optical beams.

61. The interconnect of claim 60, wherein information is encoded onto the first optical beam at the first station, information is encoded onto the second optical beam at the second station, and wherein the first optical beam arrives at the second station as a diffraction-limited beam and delivers to the second station the information encoded onto the first optical beam at the first station, and the second optical beam arrives at the first station as a diffraction-limited beam and delivers to the first station the information encoded onto the second optical beam at the second station.

62. The interconnect of claim 54, wherein the wavefront error sensor comprises conventional shearing interferometric sensors, Shack-Hartmann (local tilt) sensors, or holographic intensity-to-phase sensors.

63. The interconnect of claim 54, wherein the first and second stations comprise at least one transceiver.

64. The interconnect of claim 54, wherein at least one of the first and second stations is a moving station, and wherein the interconnect provides for auto-tracking of the at least one moving station.

65. The interconnect of claim 53, wherein the adaptive optical wavefront corrector comprises LCLVs, liquid crystal SLMs, deformable MEMS devices, optical MEMS-based SLMs, or liquid crystal cells with transparent electrodes, or any combination thereof.

66. The interconnect of claim 53, wherein the at least one optical tilt-focus error compensator comprises a pair of tilt mirrors or a pair of real-time crystal gratings.

67. A system for coupling a first optical beam originating from a first station, and a second optical beam originating from a second station, the system comprising a pair of AO modules for directing each beam into the reverse direction of the other so that first station receives the second beam and the second station receives the first beam, the system dynamically compensating for propagation errors.

* * * * *